Sept. 30, 1969  L. GREINER  3,469,555

UNDERWATER POWER PLANT

Filed Oct. 6, 1967

LEONARD GREINER
*INVENTOR.*

BY *Stewart F. Fulton*

ATTORNEY

United States Patent Office 3,469,555
Patented Sept. 30, 1969

3,469,555
UNDERWATER POWER PLANT
Leonard Greiner, Palo Alto, Calif., assignor to United Aircraft Corporation, East Hartford, Conn., a corporation of Delaware
Filed Oct. 6, 1967, Ser. No. 673,417
Int. Cl. F01k 25/08; B63c 11/46
U.S. Cl. 115—6.1    8 Claims

ABSTRACT OF THE DISCLOSURE

A power plant insensitive to back pressures encountered at depth is provided. A fluid reactant and another reactant which react exothermically to produce low vapor pressure reaction products are employed, with the fluid reactant also serving as the working fluid for the prime mover. A reaction chamber is provided in which the reaction occurs. The fluid component is passed in heat exchange relationship with the reaction chamber to generate a hot pressurized gaseous working fluid which is passed through a prime mover and then into the reaction chamber wherein the exothermic reaction occurs.

BACKGROUND OF THE INVENTION

Underwater power plants for swimmer or torpedo propulsion or for operation of underwater equipment, for example, which employ a prime mover for converting thermal energy of a working fluid to mechanical energy are generally not satisfactory when operating at substantial depths. This is because the back pressure sensed by the prime mover increases with depth and the efficiency of the prime mover decreases as the back pressure increases. According to this invention a simple inexpensive underwater power plant is provided that is not only unaffected by back pressure but is also capable of generating heat for use in warming the suit of a swimmer and in some embodiments employs fuel materials which may be regenerated for repeated use. It is accordingly an object of this invention to provide an underwater power plant unaffected by the pressure of the surroundings.

It is another object of this invention to provide a power plant in which the working fluid is one reactant in a exothermic chemical reaction.

It is another object of this invention to provide a power plant and method of operation employing a fluid reactant and a second reactant which react exothermically to produce low vapor pressure reaction products and in which the fluid reactant is the working fluid for the power plant.

It is another object of this invention to provide a power plant utilizing a fuel material that may be regenerated for repeated use.

It is another object of this invention to provide an underwater propulsion system that provides heat for swimmers.

These and other objects of this invention will be readily apparent from the following description with reference to the accompanying drawings wherein.

Broadly stated, this invention contemplates employing as the working fluid for a power plant, one reactant of an exothermic chemical reaction which produces low vapor pressure reaction products. Exothermic chemical reactions can be grouped into the two general classes of oxidation-reduction reactions in which the reactants undergo a valence change and metathetic reactions in which the reactants do not experience a valence change.

Representative oxidation-reduction reactions producing low vapor pressure reaction products in which one of the reactants may be used as a working fluid include, while not being limited to, the reaction of gases such as oxygen, fluorine, chlorine, or readily vaporizable liquids such as bromine and the interhalogen compounds such as $ClF_3$, $BrF_3$, and $BrF_5$ with a metal to produce halides or oxides of the metal.

Suitable metathetic reactions include, while not being limited to, hydration reactions wherein water is reacted with a metal oxide to produce the hydroxide, or where water of hydration is added to an hydrateable compound; carbonation reactions in which $CO_2$ is reacted with a metal oxide to produce the carbonate; and sulfation reactions wherein $SO_2$ is reacted with a metal oxide to produce the sulfite. Although many metal oxides undergo such reactions with the liberation of usable heat, the alkali and alkane earth metal oxides are preferred. The following reactions are illustrative.

Hydration reactions (1) $\quad Li_2O + H_2O \rightarrow 2LiOH + heat$ (2) $\quad NaOH + H_2O \rightarrow NaOH \cdot H_2O + heat$ (3) $\quad CaO + H_2O \rightarrow Ca(OH)_2 + heat$ Carbonation reactions (4) $\quad Li_2O + CO_2 \rightarrow Li_2CO_3 + heat$ Sulfation reactions (5) $\quad Na_2O + SO_2 \rightarrow Na_2SO_3 + heat$ In the cycle of this invention the working fluid is a reactant and generally a particular weight of working fluid will be capable of chemically producing a greater amount of heat than can be effectively removed and utilized at reasonable temperatures and pressures by that same weight of working fluid. Therefore, although oxidation-reduction reactions are generally more energetic than metathetic reactions, metathetic reactions are preferred according to this invention since the excess energy is not required, they are more easily controlled and employ relatively inexpensive materials which can be utilized in the system with greater ease and safety.

Figure 1:
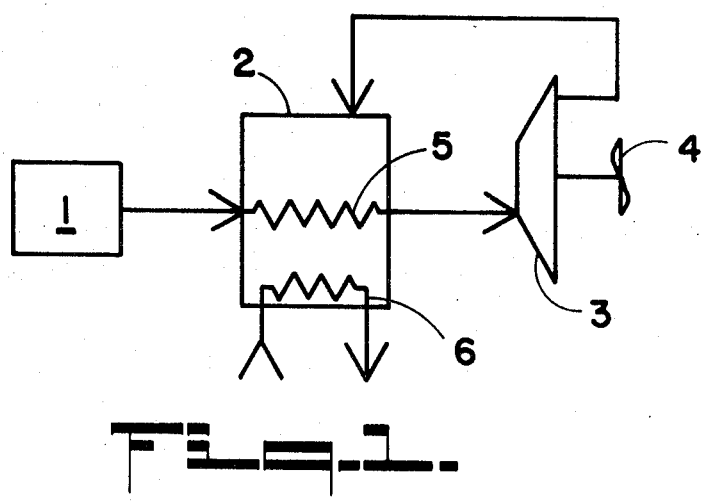
FIGURE 1 is a flow diagram of the cycle of this invention.

Referring now to FIGURE 1, the cycle of this invention will be readily understood. The power plant of this invention comprises a source 1 of a gas or a vaporizable liquid, a reaction chamber 2, and a prime mover 3 which drives a mechanical load 4. Reaction chamber 2 contains a material which will react exothermically with the fluid material of source 1 to produce low vapor pressure reaction products as described above. Chamber 2 is preferably evacuated after filling to remove the air and to maintain operating back pressures as low as possible. In steady state operation the fluid material is caused to flow under pressure from source 1 through heat exchanger 5 where it is converted into a hot pressurized gas. The gas then flows through prime mover 3 where it expands to generate mechanical energy and is exhausted from prime mover 3 into reactor 2 wherein it reacts with the other reactant to produce heat. Generally, more heat will be generated by the chemical reaction than can be effectively removed by the working fluid and an additional heat exchanger 6 is provided for removal of excess heat to maintain a constant operating temperature. Heat exchanger 6 may have any form and may for example be in the form of fins on reactor 2 or may comprise heat exchanger coils in reactor 2. As can be seen, the back pressure sensed by the prime mover 3 is the pressure within reactor 2 which is independent of the pressure of the environment.

Figure 2:
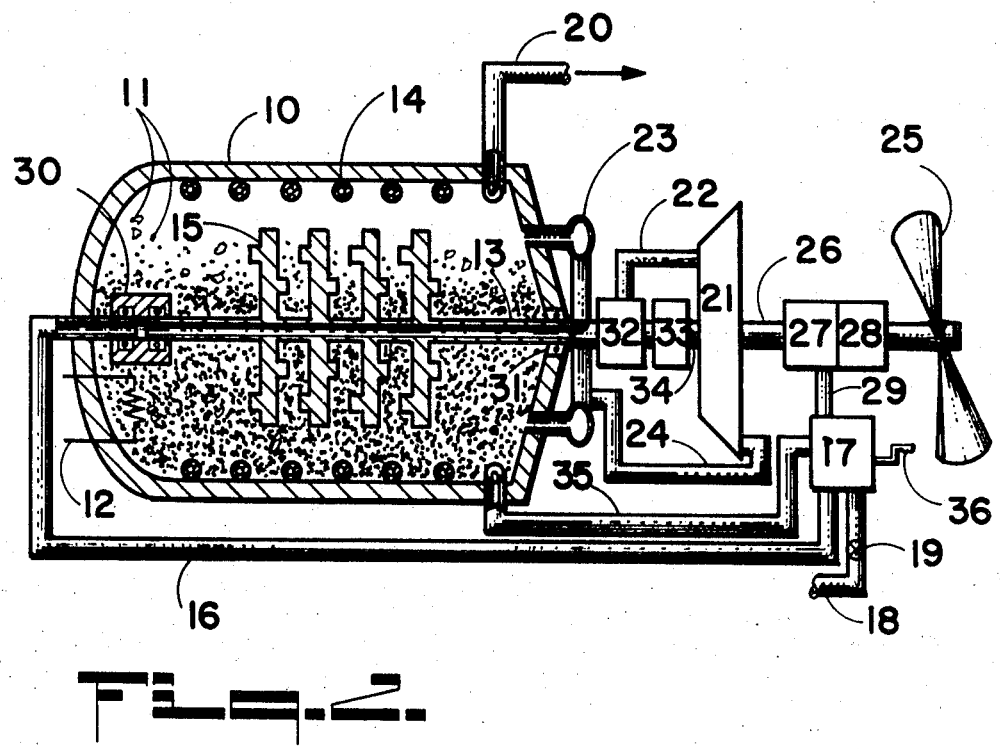
FIGURE 2 is a schematic representation partly in section of an embodiment of a power plant according to this invention.

Referring now to FIG. 2, a power plant for underwater propulsion is illustrated which employs ambient water as the working fluid reactant. The power plant comprises a reactor vessel 10 containing a charge of particles of a reactant 11, an electrical heater element 12, a boiler tube 13, and an auxiliary heat exchange coil 14. Reactor 10 is preferably evacuated and sealed after loading with reactant 11. Boiler tube 13 may be adapted for rotation and fitted with fins or extensions 15 which agitate the contents and improve heat transfer to the boiler tube 13. Feed lines 16 and 35 supply water to boiler tube 13 and heat exchanger 14 respectively from pump 17 and inlet 18, fitted with valve 19. The outlet 20 of heat exchanger coil 14 is preferably connected to the suit of a swimmer (not shown) for heating purposes. Steam generated in boiler tube 13 is directed to a prime mover 21 which is preferably a small reciprocating steam engine by line 22 and the spent steam from the prime mover is directed to injector manifold 23 by line 24 for introduction into reactor 10. Prime mover 21 drives propellor 25 and pump 17 by means of shaft 26, gear box 27, clutch 28, and shaft 29. When a rotating boiler tube is employed, seals 30 and 31 are used and boiler tube 13 extends through fitting 32 connected to line 22 which fitting provides a rotating seal with tube 13. Tube 13 is driven by prime mover 21 by means of gear box 33 and shaft 34. The portion of tube 13 within fitting 32 is provided with openings in the wall to permit flow of steam from tube 13 to line 22. It can be understood that the propulsion system of FIGURE 2 may be thermally insulated and mounted within a suitable streamlined housing which may be grasped by a swimmer or mounted on the back of a swimmer for propulsion purposes.

In operation the contents of reaction chamber 2 can be heated to operating temperature by means of heater 12 connected to a suitable source of electric power (not shown). The unit would then be disconnected from the power source and immersed in the water. Valve 19 would be opened and water caused to flow into boiler tube 13 by operating pump 17 with hand crank 36. The water flashes to steam and drives the prime mover 21 which activates pump 17 providing for self-sustained operation.

EXAMPLE 1

A propulsion system of FIGURE 2 employing a 70% efficient prime mover driving a 65% efficient propellor may be employed to propel a swimmer at about 2.5 knots for 1 hour. Such a system requires about 0.28 HP of propulsive power. The reactor 10 is charged with about 8 pounds of $Li_2O$ and operates at about 450° F. and saturated steam at about 445° F. and 400 p.s.i.a. is generated in the boiler tube. The pressure in the reactor at this temperature is negligible and a 5 p.s.i.a. back pressure due primarily to flow losses is sensed by the prime mover. In order to maintain reaction chamber temperature at about 450° F. approximately 1480 watt hours of heat must be rejected by the secondary heat exchanger 14. Swimmer heating requirements are estimated at about 700 watt hours so adequate heat is available from line 20 to heat a swimmer's suit. The $Li_2O$ system has an advantage with respect to fuel cost in that after use the LiOH produced can be converted back to $Li_2O$ by heating, for example, by heat element 12. Emergency operation of the system of this example for longer periods at reduced power levels can also be obtained by continuing the operation to produce $LiOH \cdot H_2O$.

This invention has been described with respect to a specific embodiment thereof, however, the invention should not be construed as limited thereto. Various modifications will be apparent to workers skilled in the art and can be made without departing from the scope of this invention which is limited only by the following claims.

I claim:
1. An underwater power plant for providing propulsion and heat for a swimmer comprising
   (a) a reaction chamber,
   (b) a reactant in said reaction chamber,
   (c) a prime mover,
   (d) propulsion means driven by said prime mover,
   (e) first and second heat exchange means in heat transfer relationship with said reaction chamber,
   (f) a working fluid, said working fluid being capable of undergoing an exothermic reaction with said reactant to produce low vapor pressure reaction products,
   (g) means for passing said working fluid through said first heat exchange means and into said prime mover,
   (h) means for passing said working fluid from said prime mover into said reaction chamber whereby said prime mover and said reactant undergo an exothermic chemical reaction, and
   (i) means for passing a fluid through said second heat exchange means and into heat exchange relationship with said swimmer.

2. The power plant of claim 1 wherein said working fluid is ambient water.

3. The power plant of claim 2 wherein said reactant is an alkali metal oxide.

4. A power plant comprising:
   (a) a reaction chamber containing a reactant selected from the group consisting of alkali metal oxides and alkaline earth metal oxides,
   (b) a source of a working fluid selected from the group consisting of $H_2O$, $CO_2$, and $SO_2$, which materials are capable of reacting exothermically with said reactant to produce low vapor pressure reaction products,
   (c) a prime mover,
   (d) first fluid conducting means for flowing said working fluid from said source and through said reaction chamber in heat exchange relationship therewith, said fluid conducting means maintaining said working fluid physically separated from said reactant,
   (e) second fluid conducting means for flowing said working fluid from said first fluid conducting means through said prime mover and into contact with said reactant in said reaction chamber whereby said working fluid and said reactant will react exothermically producing heat and low vapor pressure reaction products, and
   (f) means for retaining said reactant, working fluid and reaction products within said reaction chamber.

5. The power plant of claim 4 further comprising a secondary heat exchange means in heat exchange relationship with said reaction chamber.

6. The power plant of claim 5 wherein said reactant is an alkali metal oxide and said working fluid is water.

7. A method for generating mechanical power comprising:
   (a) heating a working fluid selected from the group consisting of $H_2O$, $CO_2$ and $SO_2$ by passage thereof through a reaction chamber in heat exchange relationship with and in physical separation from the contents of said reaction chamber,
   (b) converting thermal energy of said working fluid to mechanical energy,
   (c) introducing said working fluid into said reaction chamber,
   (d) reacting said working fluid with a material selected from the group consisting of alkali metal oxides and alkaline earth metal oxides to produce low vapor pressure reaction products, and
   (e) retaining said reaction products in said reaction chamber.

8. The method of claim 7 further comprising the step of rejecting excess heat from said reaction chamber whereby the temperature in said reaction chamber may be maintained constant.

References Cited

UNITED STATES PATENTS

| | | | |
|---|---|---|---|
| 333,222 | 12/1885 | Honigmann | 122—21 |
| 1,349,969 | 8/1920 | Leathers | 122—21 XR |
| 2,731,798 | 1/1956 | Welsh et al. | 60—59 |
| 3,353,349 | 11/1967 | Percival | 60—37 |

FOREIGN PATENTS

| | | |
|---|---|---|
| 3,694 | 2/1909 | Great Britain. |
| 190,502 | 9/1937 | Switzerland. |

MARTIN P. SCHWADRON, Primary Examiner

ROBERT R. BUNEVICH, Assistant Examiner

U.S. Cl. X.R.

60—37, 108; 122—21